United States Patent
Chittari et al.

(10) Patent No.: US 11,995,396 B2
(45) Date of Patent: *May 28, 2024

(54) AUTOMATIC BOT CREATION BASED ON SCRIPTS

(71) Applicant: LIVEPERSON, INC., New York, NY (US)

(72) Inventors: Ravikiran Chittari, Cupertino, CA (US); Eswar Priyadarshan, Los Altos, CA (US); Robert LoCascio, New York, NY (US); Jonathan Altschuler, Los Gatos, CA (US); Suresh Ramakrishnaiah, Pleasanton, CA (US); Htet Win, Union City, CA (US); Chuqing He, Sunnyvale, CA (US); Matthew Dunn, Middletown, RI (US)

(73) Assignee: LIVEPERSON, INC., New York, NY (US)

(*) Notice: Subject to any disclaimer, the term of this patent is extended or adjusted under 35 U.S.C. 154(b) by 654 days.

This patent is subject to a terminal disclaimer.

(21) Appl. No.: 17/084,857

(22) Filed: Oct. 30, 2020

(65) Prior Publication Data

US 2021/0150137 A1  May 20, 2021

Related U.S. Application Data

(63) Continuation of application No. 16/684,356, filed on Nov. 14, 2019, now Pat. No. 10,853,568.

(Continued)

(51) Int. Cl.
| | |
|---|---|
| *G06F 17/00* | (2019.01) |
| *G06F 3/04847* | (2022.01) |
| *G06F 40/186* | (2020.01) |
| *G06F 40/197* | (2020.01) |
| *H04L 51/02* | (2022.01) |
| *H04L 51/216* | (2022.01) |

(52) U.S. Cl.
CPC ........ *G06F 40/186* (2020.01); *G06F 3/04847* (2013.01); *G06F 40/197* (2020.01); *H04L 51/02* (2013.01); *H04L 51/216* (2022.05)

(58) Field of Classification Search
CPC .. G06F 40/186; G06F 3/04847; G06F 40/197; H04L 51/02; H04L 51/216
See application file for complete search history.

(56) References Cited

U.S. PATENT DOCUMENTS

| | | | |
|---|---|---|---|
| 10,853,568 B2 | 12/2020 | Chittari et al. | |
| 10,860,629 B1 * | 12/2020 | Gangadharaiah ... | G06F 16/3329 |

(Continued)

FOREIGN PATENT DOCUMENTS

| | | |
|---|---|---|
| WO | WO 2020/102571 A1 | 5/2020 |

OTHER PUBLICATIONS

Vaziri, Mandana, et al. "Generating chat bots from web API specifications." Proceedings of the 2017 ACM SIGPLAN international symposium on new ideas, new paradigms, and reflections on programming and software. 2017 (Year: 2017).*

(Continued)

*Primary Examiner* — Andrew T McIntosh
(74) *Attorney, Agent, or Firm* — POLSINELLI LLP

(57) ABSTRACT

Methods and systems for transcript-based bot creation are provided. Information may be stored in memory regarding different automation templates associated with different statement types. A transcript may be imported that includes statements, which may be analyzed and classified as one or more of the different statement types. The imported transcript may be displayed in a graphic user interface with its statements displayed in accordance with the automation templates associated with the respective statement type. User input may be received, including modification input that modifies at least one automation template associated (Continued)

with at least one statement of the displayed transcript designated as an integration point. A custom bot may thereafter be generated based on the modification input and configured to conduct a conversation based on the imported template and to initiate a workflow at the integration point in accordance with the modified automation template.

30 Claims, 19 Drawing Sheets

Related U.S. Application Data

(60) Provisional application No. 62/768,699, filed on Nov. 16, 2018.

(56) References Cited

U.S. PATENT DOCUMENTS

| | | |
|---|---|---|
| 2014/0122619 A1 | 5/2014 | Duan |
| 2016/0202957 A1* | 7/2016 | Siddall .................... G06F 8/34 717/109 |
| 2016/0352658 A1* | 12/2016 | Capper .................. G06N 3/004 |
| 2018/0054464 A1 | 2/2018 | Zhang et al. |
| 2018/0107461 A1 | 4/2018 | Balasubramanian et al. |
| 2018/0131645 A1 | 5/2018 | Magliozzi et al. |
| 2019/0311036 A1* | 10/2019 | Shanmugam ........... G06F 40/56 |

OTHER PUBLICATIONS

Cahn, Jack. "CHATBOT: Architecture, design, & development." University of Pennsylvania School of Engineering and Applied Science Department of Computer and Information Science (2017) (Year: 2017).*
Jain, Mohit, et al. "Evaluating and informing the design of chatbots." Proceedings of the 2018 designing interactive systems conference. 2018 (Year: 2018).*
International Search Report and Written Opinion for PCT Application No. PCT/US2019/061527 dated Feb. 6, 2020, 10 pages.
Negi et al., Automatically Extracting Models form Conversational Transcripts, 2009, IEEE, p. 890-895.
Non-Final Office Action dated Mar. 13, 2020 for U.S. Appl. No. 16/684,356, 16 pages.
Notice of Allowance dated Jul. 31, 2020 for U.S. Appl. No. 16/684,356, 11 pages.

* cited by examiner

FIG. 3A

| INTENT MANAGER | STUDIO | REPOSITORY | DASHBOARD | | |
|---|---|---|---|---|---|
| Jun 17, 2018 - Today 08:00am | Intents: All | MCS: All | ☐ Include unclassified utterances | Total utterances: 23,253 Detected: 16,045 (69%) | Unclassified: 7208 (31%) |

| UTTERANCE | INTENT |
|---|---|
| Hello I have a problem with my bill, my monthly bill was 115$, I don't understand why now it is 153$<br>2 minutes ago | Billing issues<br>(Billing) |
| can you tell me how much I have left on my account to get another phone with?<br>3 minutes ago | Account balance |
| I want to put a block on my account not to permit calls out the USA<br>3 minutes ago | Block international calls<br>(New) |
| I'm just saying that for a very long time my bill has been between $165 & $175. Now its $198? Thats quite a jump don't you think? So why the increase is my question.<br>4 minutes ago | Billing issues<br>(Billing) |
| Good evening! I have a question regarding our signal/service. Is there currently a disturbance in our network? All day we have been having trouble with our phones. Call won't go through or will get dropped. Very bad signal, etc,<br>5 minutes ago | Low Signal |
| So today I called in about my service. They told me it's because a tower was down and needed fixed. We then reset all 3 phones on the line for the lte. But I am no where near that tower and I have absolutely no service. So again why am I paying $360 every month for no service?<br>9 minutes ago | Low Signal |
| Is it possible to cancel an order while it's still being processed?<br>15 minutes ago | Cancel order |
| I have repeatedly tried cancelling service on my line yet I continue to be charged.<br>15 minutes ago | Cancel service |

Intents volume · · · Intents trend

Volume trend
Calculated from detected utterances only

Average MCS trend
Calculated from detected utterances only

View by: Intents ▾

Search intents 🔍

☐ Billing issues
☒ Low Signal
☒ Payment Arrang...
☐ Cancel service
☐ Complain to super...
☐ Update payment info
☐ Activate Sim Card
☐ Unlock phone
☐ Family plan
☐ Bill dispute
☐ Account balance
☐ Add a line

FIG. 3C

AUTOMATIC BOT CREATION BASED ON SCRIPTS

CROSS-REFERENCE TO RELATED APPLICATIONS

This application is a continuation of U.S. patent application Ser. No. 16/684,356 filed Nov. 14, 2019, which claims the benefit of U.S. Provisional Patent Application No. 62/768,699 filed Nov. 16, 2018, both of which are incorporated herein by reference in their entirety for all purposes.

BACKGROUND OF THE INVENTION

1. Field of the Invention

The present invention generally relates to bot creation. More specifically, the present invention relates to automatic bot creation based on scripts.

2. Description of the Related Art

Presently, most contact center operations occur by manual means and are performed by human agents. Such agents may be trained to answer questions and provide answers and basic services on behalf of a specific brand. Part of agent training may therefore include how to interact with a consumer in a conversation that reflects well on the brand. Such conversations may therefore not only be responsive to a particular consumer query or request, but may be informative, solves problems, and otherwise engage the consumer. Due to the training requirements of providing effective service, contact centers cannot scale well by just adding more people.

Meanwhile, presently available chat bots are not as effective as human agents at engaging the consumer, discerning the precise query or request, and being responsive thereto. FIG. 1, for example, illustrates a number of different chat bot failures, resulting from inability to identify precisely what the user is asking. Such failure to properly and accurately identify the purpose of the user query or request thereafter leads to failure to respond appropriately or in a way that satisfies the user. Further, creating a bot is generally a complex and time-intensive engineering process performed by bot coders and developers who do not have firsthand knowledge or training in contact center operations. Such a process is likewise not scalable, and the resulting bots may lack the engagement ability of human agents.

There is, therefore, a need in the art for improved systems and methods for intelligence-driven automatic bot creation based on scripts and agent interaction.

SUMMARY OF THE CLAIMED INVENTION

Embodiments of the present invention include methods and systems for transcript-based bot creation. Information may be stored in memory regarding a set of different automation templates associated with different statement types. A transcript may be imported that includes a plurality of statements, which may be analyzed to classify the statements as one or more of the different statement types. The imported transcript may be displayed in a graphic user interface with its statements displayed in accordance with the automation templates associated with the respective statement type. User input may be received, including modification input that modifies at least one automation template associated with at least one statement of the displayed transcript. Designated as an integration point. A custom bot may thereafter be generated based on the modification input and configured to conduct a conversation based on the imported template and to initiate a workflow at the integration point in accordance with the at least one modified automation template.

BRIEF DESCRIPTION OF THE FIGURES

Figure 3C:
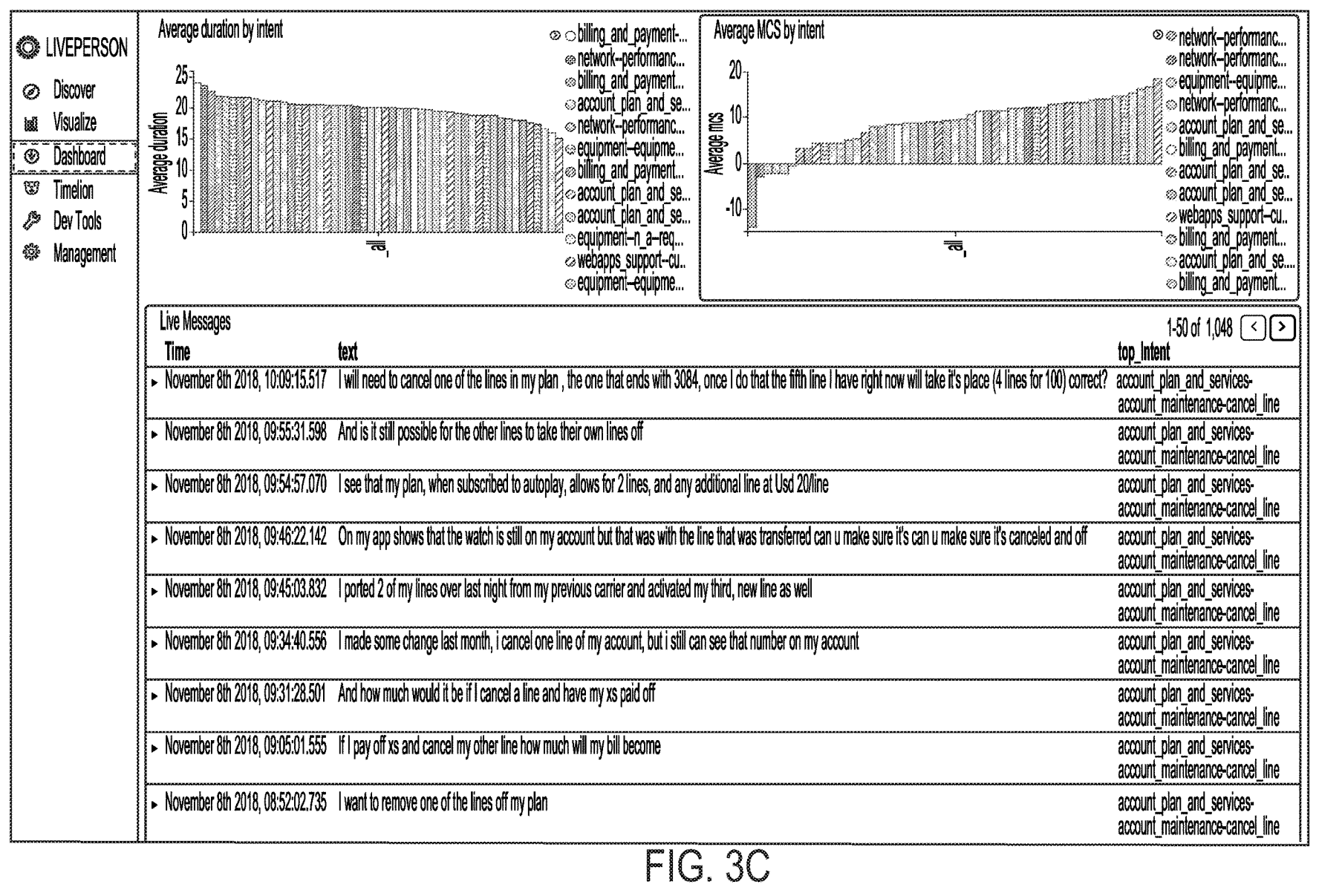

FIG. 3A-3F illustrate a variety of dashboards that provide different analyses of statements and conversations.

DETAILED DESCRIPTION

Embodiments of the present invention provide for intelligence-driven automatic bot creation based on scripts and agent interaction. Conversations between consumers and agents may be tracked in real-time and over time to discern insights as to which ones result in successful outcomes and which do not. Certain metrics and scores may be evaluated in real-time and over time to evaluate which statement types result in certain actions and result in consumer satisfaction. Certain queries may result in connecting the consumer with billing, marketing and sales, purchasing, or customer service, for example, and certain statements may indicate satisfaction with such results. As such, individuals with specialized knowledge (e.g., agents regarding customer service) may participate in bot creation without having to generate software code. Instead, automation templates may be intelligently identified and matched to scripts, as well as modified (on-the-fly or coordinated), trained, refined, and optimized without the need for code.

As such, analyses between conversations between consumers and agents may allow for better and more accurate discernment of consumer queries and requests, as well as better and more accurate responses from agents (or bots). As used herein, intent refers to a user desire to change something related to a brand or business. Such change may apply to a plan type, upgrade a product, to buy a shoe, to learn about a store's inventory for a certain product set, or to learn something about a product they don't understand today. From the business perspective, intent may be used as the unit of management by which contact centers initiate certain automated actions and/or automated workflows. It's a key concept for understanding key automations needed, how to route customer contacts, whether and how well agents are succeeding, how to best incentivize the agent team, etc. It also improves understand why customers are reaching out to the brand, as well as analyze recent trends and customer zeitgeists. Because of this, intent recognition may serve as the basis for intelligence-driven automated conversation building, management, and analyses.

Figure 1:
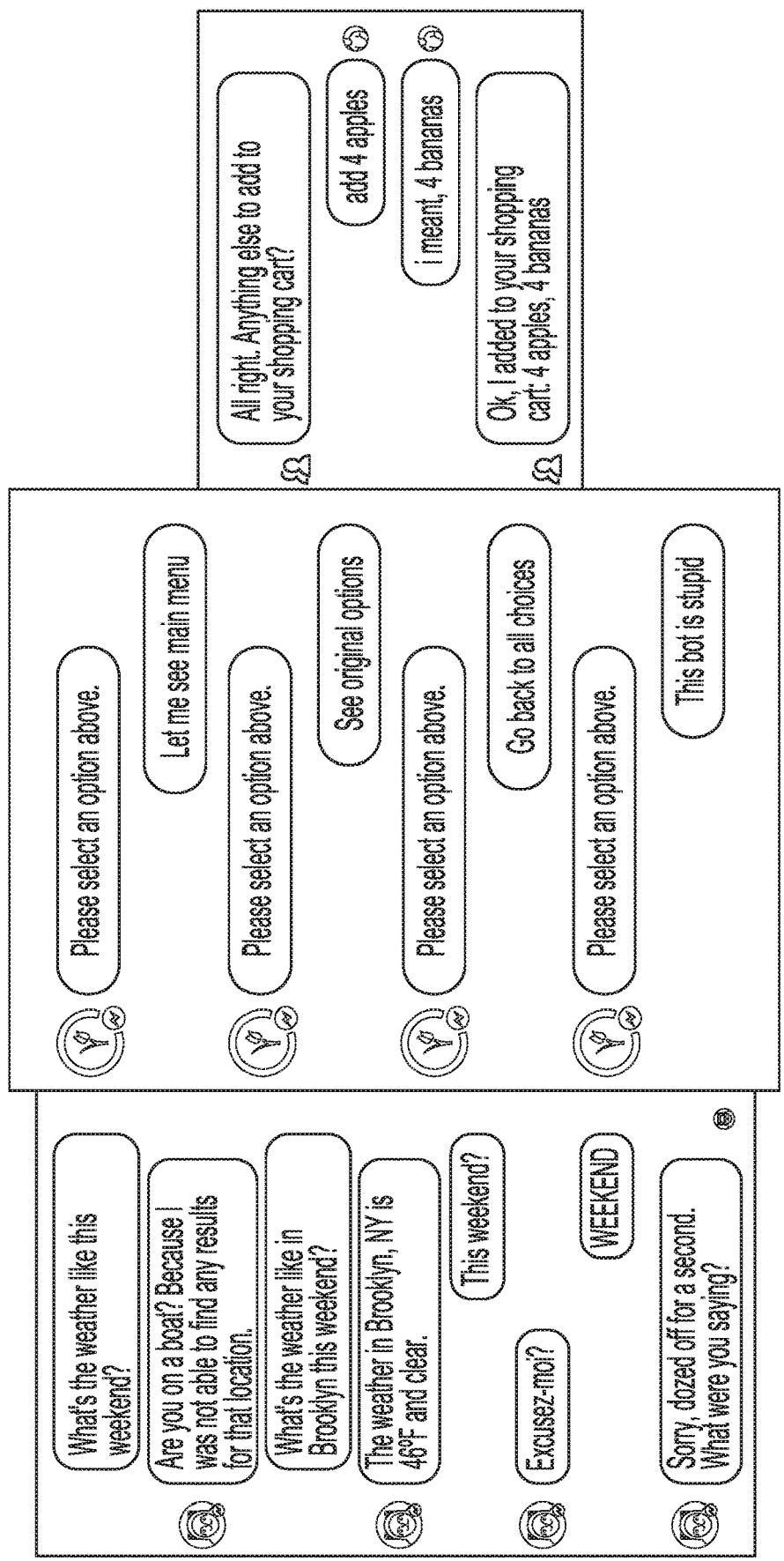
FIG. 1 illustrates a number of different chat bot failures, resulting from inability to identify precisely what the user is asking.
Figure 2:
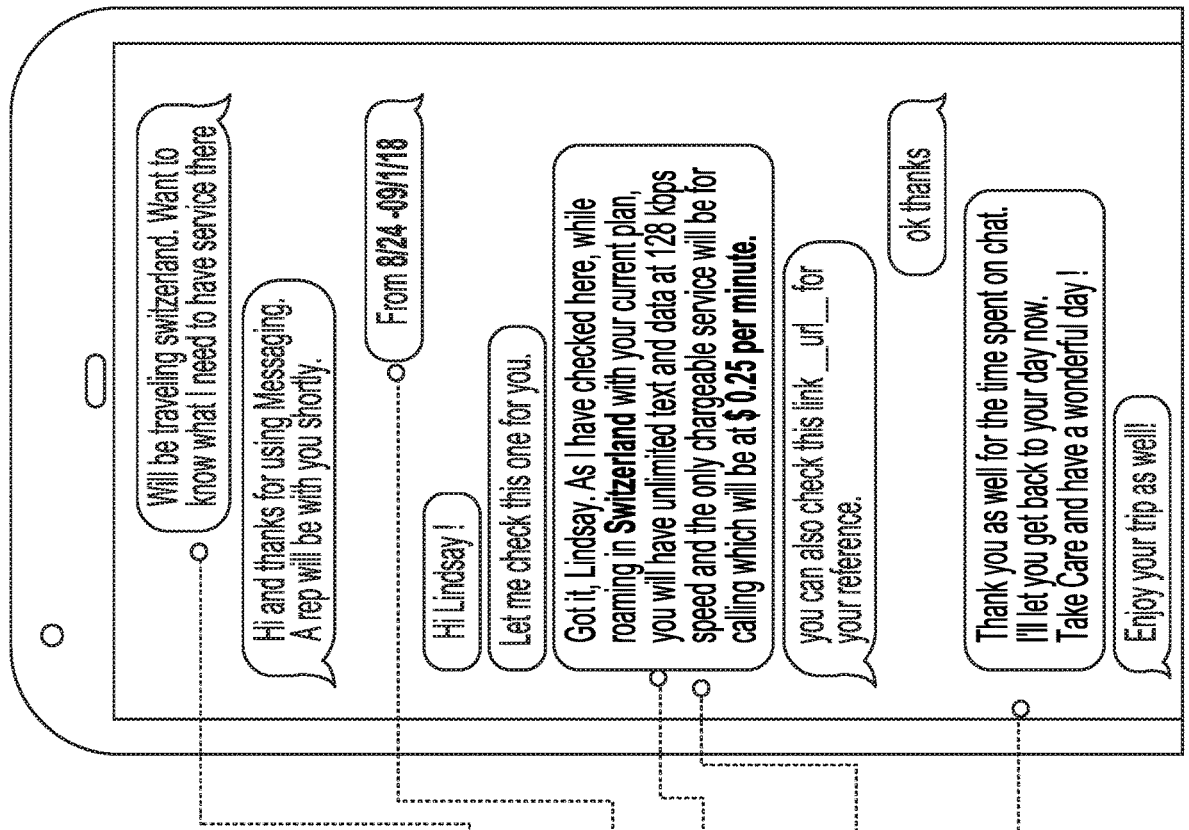
FIG. 2 illustrates an exemplary successful conversation with a consumer/user and analysis thereof.
Figure 3B:
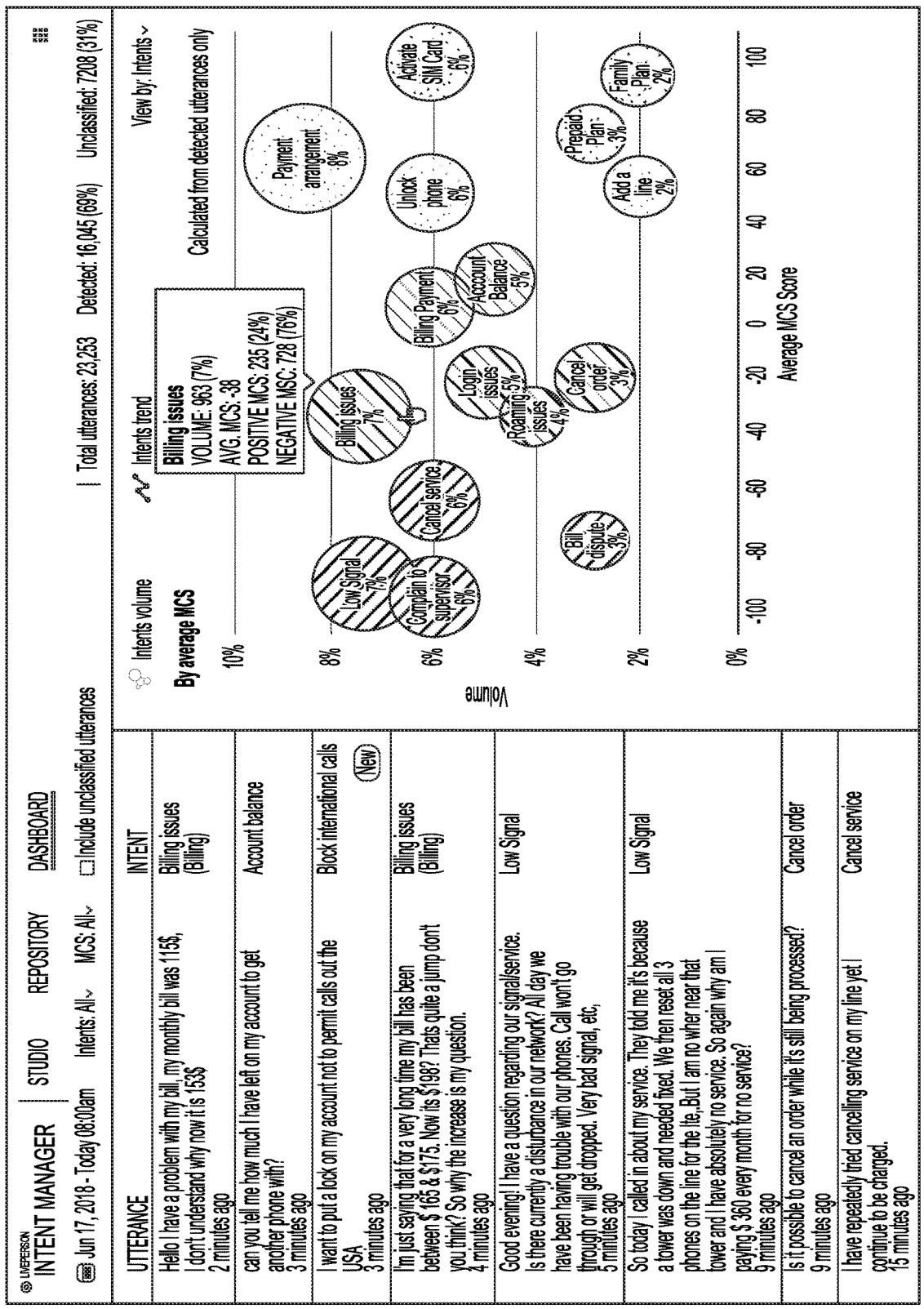
Figure 3D:
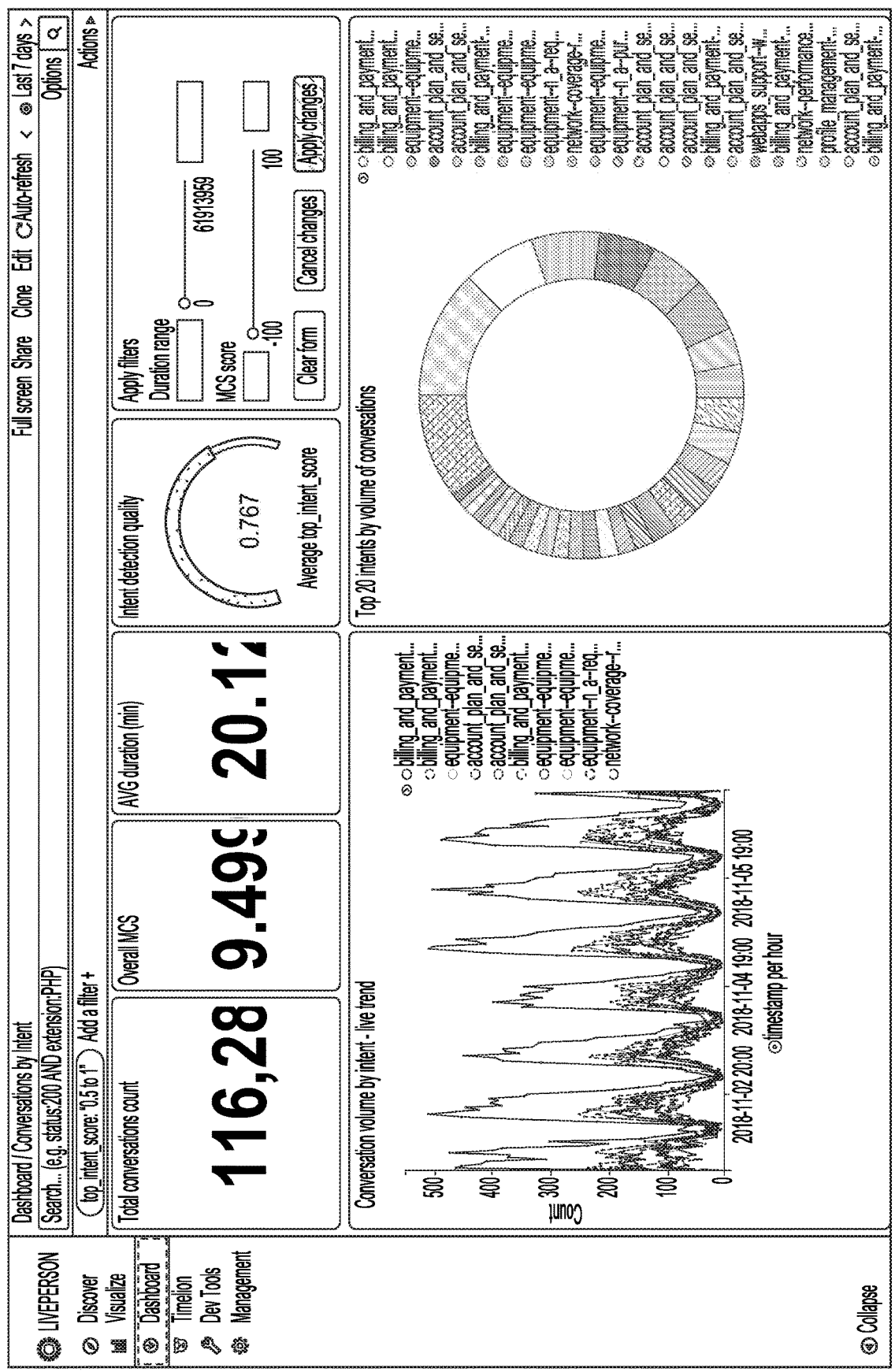
Figure 3E:
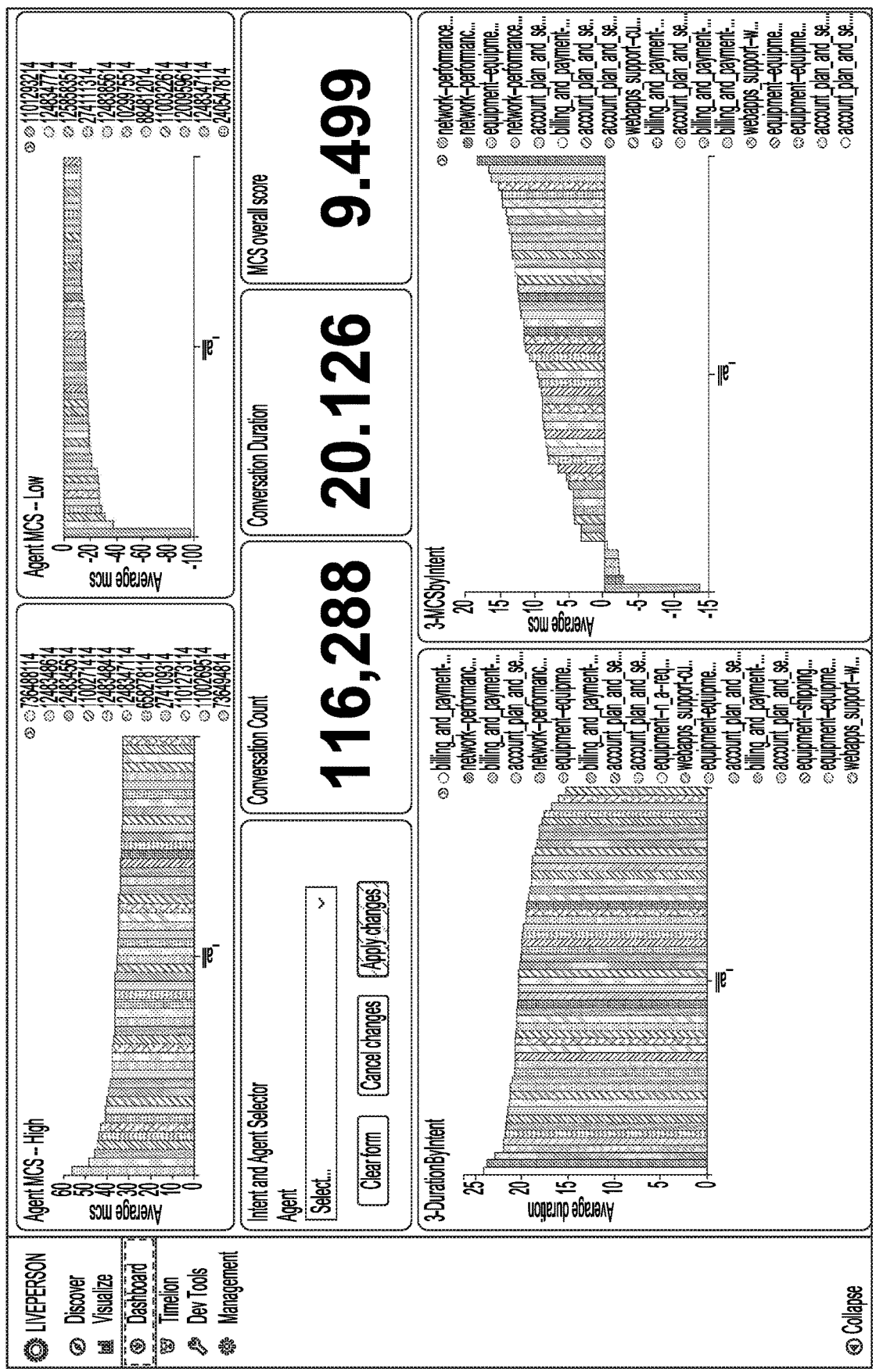
Figure 3F:
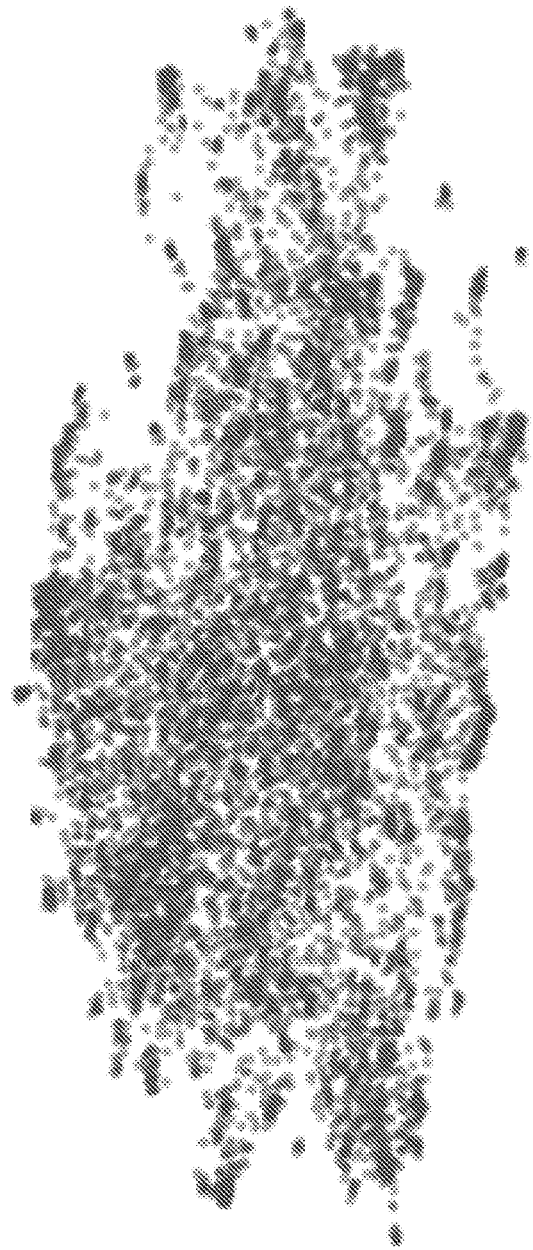

FIG. 2 illustrates an exemplary successful conversation with a consumer/user and analysis thereof. The consumer statement may be identified as including certain indicators of intent, specifically the intent to obtain information (e.g., hours, product lines and options, billing) regarding the business' services under certain circumstances (e.g., in Switzerland during a time period of Aug. 24-Sep. 1, 2018). The agent thereafter successfully identified the proper result based on the intent and the applicable modifiers. The success of the conversation may be indicated by the last user response (e.g., including praise and thanks versus criticism). In addition to the actual content of the conversation, certain other parameters and metrics may be tracked and measured in order to evaluate success and improve how later conversations are designed. For example, information regarding text size, message length, timing and duration, different icons (to indicate bot or human agent), etc., may be tracked to evaluate the relative successes thereof. Sentiment scores may be assigned, for example, to quantify a degree of success of a conversation; such scores may be based on the language and statements provided by the consume/user during the conversation.

FIG. 3A-3F illustrate a variety of dashboards that provide different analyses of statements and conversations. Each statement or conversation may be associated with different intents (e.g., different actions or workflows), as well as different measured parameters (e.g., duration, sentiment scores, trends over time). The dashboards may further include different visual charts and plots based on certain selected metrics. In addition, filter tools may be applied by agents and other administrators to filter by selected parameters, metrics, and agents. Such analyses and filter tools may be applied in real-time to current conversations, as well as a collection of past conversations, to provide insights that aid subsequent conversation design. Such dashboards may be used by agents or other brand/business administrator to gain real-time insights across multiple conversations occurring in real-time, as well as the evolving set of historical conversational data and related metrics. The intent of a statement may be analyzed in accordance with such analytics, whether in real-time or a subsequent time. Such analysis may thereafter be used to intelligently analyze agent and bot performance, as well as scripts thereof. Such intelligence may further be used as described herein to guide creation of a customized bot.

Figure 4:
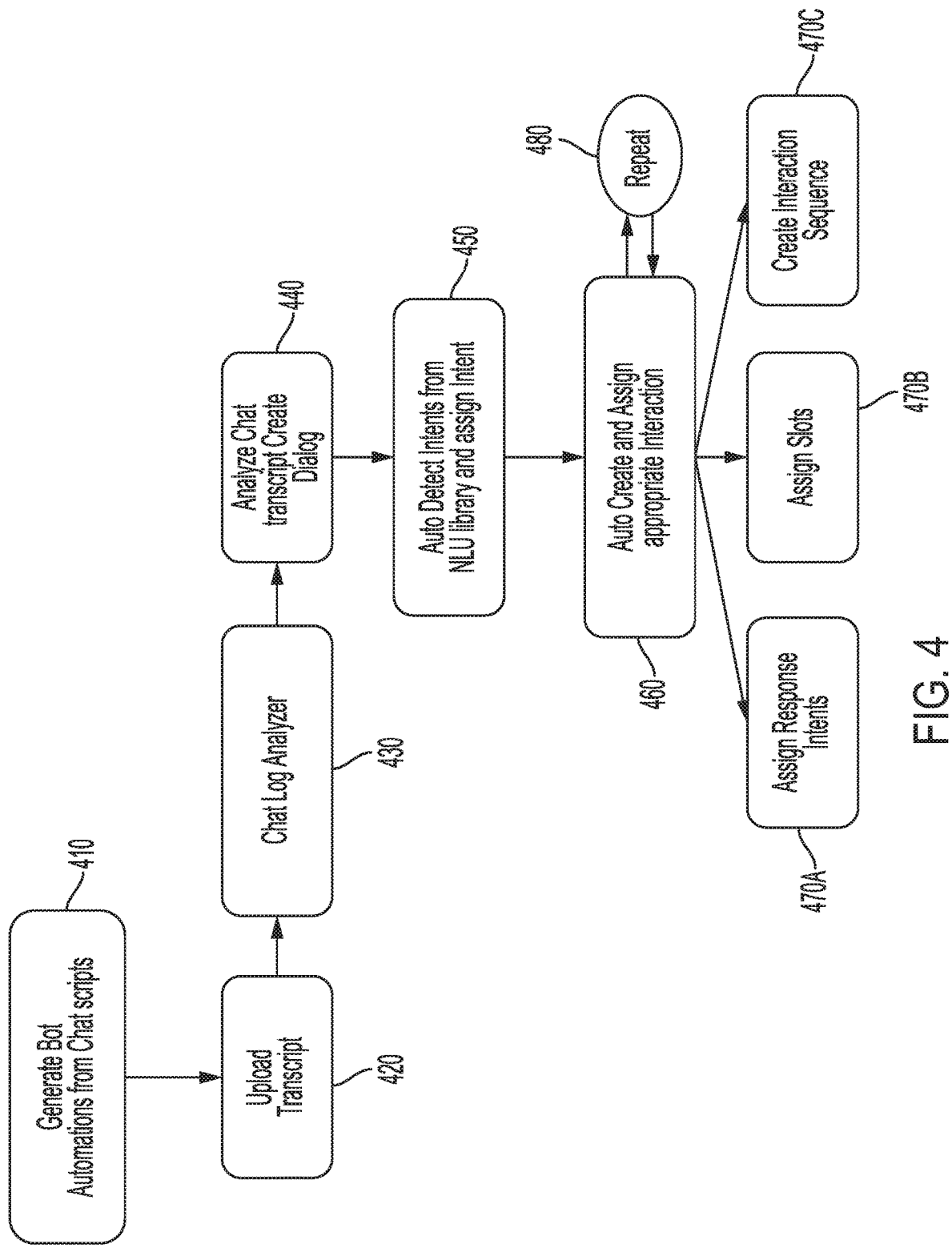
FIG. 4 is a flowchart that illustrates an exemplary method for automated bot creation.

FIG. 4 is a flowchart that illustrates an exemplary method for automated bot creation. In step 410 of such method, certain successful chat transcripts may be identified and used as the basis for creating a custom bot capable of identifying the specific user intent and initiating an automated workflow in response. The success may be identified based on various analytics, including those discussed in relation to FIGS. 3A-G.

In step 420, an agent or other administrator may select the identified transcript to upload or otherwise designate a specific transcript to a module executable to generate a customizable bot. Such transcript may have been identified, evaluated, scored, etc., based on intent analytical tools and selected from a dashboard such as illustrated in FIGS. 3A-3G.

In step 430, the selected transcript(s) may therefore be analyzed to classify the statements included therein. For example, statements made by consumer/user may be distinguished from those made by the agent (human or bot). Further, the statements by the user may be analyzed to detect all the relevant pieces of conversation (e.g., intents, interactions, goals). Such analyses may make use of one or more natural language understanding (NLU) tools that are available through third parties (e.g., Google, Watson, Microsoft, Amazon Lex) or a brand's own proprietary systems.

In step 440, a display of a dialogue may be generate based on the analysis. For example, the statements from a customer may be separated from those of the agent or bot. Visual indicators may be included in a graphic user interface (GUI) to illustrate representative statements of each participant.

In step 450, different intents and modifier options may be detected in the transcript and characterized by type (e.g., type of intent, type of modifier). In step 460, an automation (e.g., automated interaction) may be identified based on the identified intent and characterization(s) thereof.

In steps 470A-C, the automation may be assigned, modified, and used to create an interaction sequence or workflow that is responsive to the identified intent and characterization(s). In step 470A, such characterization may be used to identify a responsive statement (or set of statements) as in integration point where an automated action or workflow (collectively, automation) may be initiated in response. Such automations may be predefined and associated with specific types of statements (indicating different intents or modifiers). The automations may be predefined by the brand/business or may be provided through third party services. Various APIs may be made available that allow for integration with automations powered by different available and/or proprietary systems. In step 470B, the characterization(s) associated with the identified intent may be used as parameters to fill in slots of information needed to run an automation (e.g., where intent is search and the slots specify black shoes in size 7). In step 470C, a custom interaction sequence or automation may be generated. In step 480, the process may be repeated for other interaction or integration points and other intents.

Figure 5:
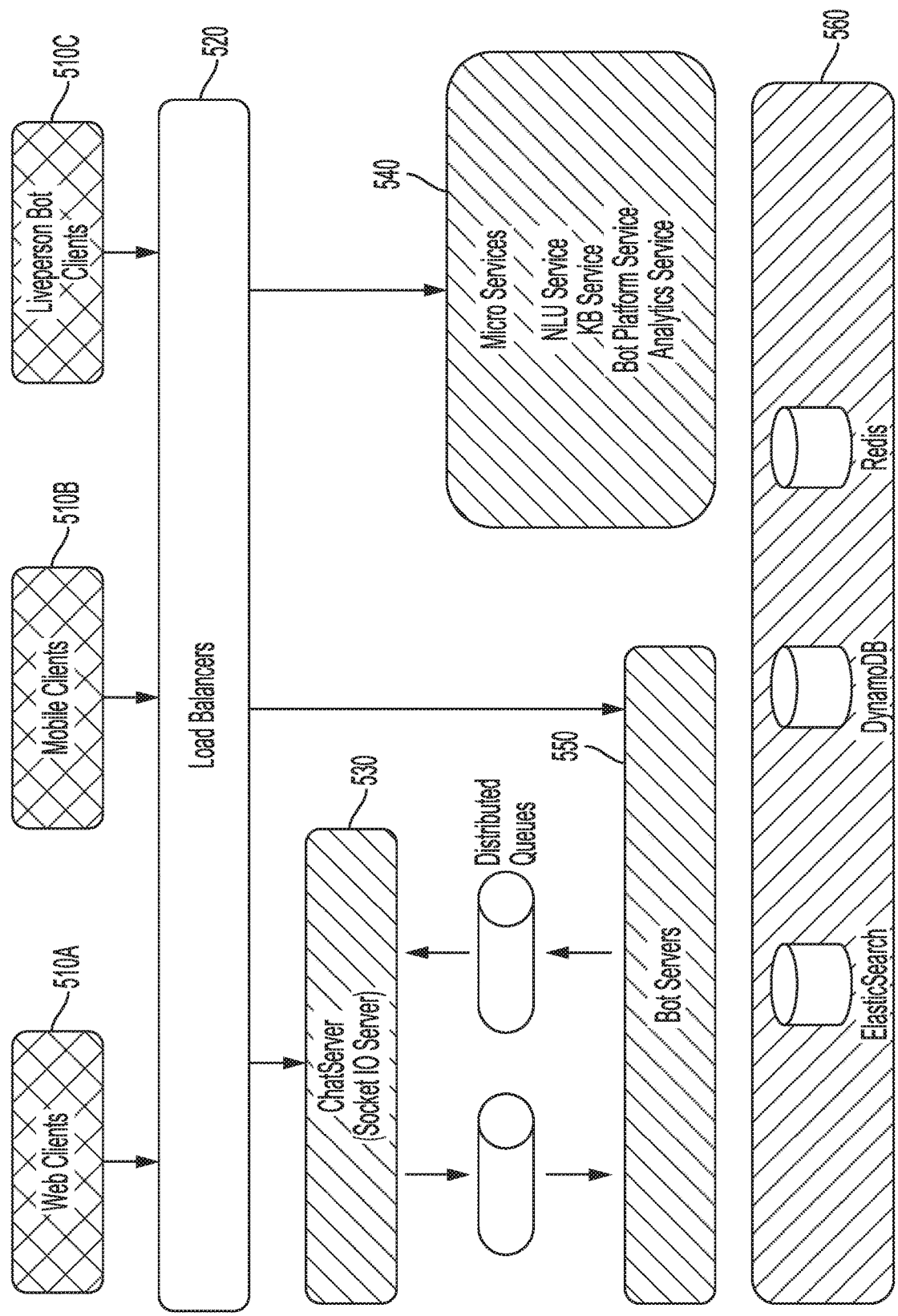
FIG. 5 is a diagram illustrating an exemplary system architecture for automated bot creation.

FIG. 5 is a diagram illustrating an exemplary system architecture for automated bot creation. As illustrated, the system may include a variety of different client devices 510A-C that may be used to generate bots. Such clients may include, for example, web clients 510A, mobile clients 510B, and bot clients 510C. Load balancers 520 may be used to distribute network and/or application traffic to various servers.

Exemplary servers may include chat servers 530, micro services 540, and bot servers 550, as well as various supporting tools 560. As illustrated, multiple different services may be made accessible and integrated into bot creation and operation. The resulting bot may therefore be able to access existing services and tools in order to initiate and conduct conversations, as well as to initiate and conduct workflows responsive to the conversations.

Figure 6A:
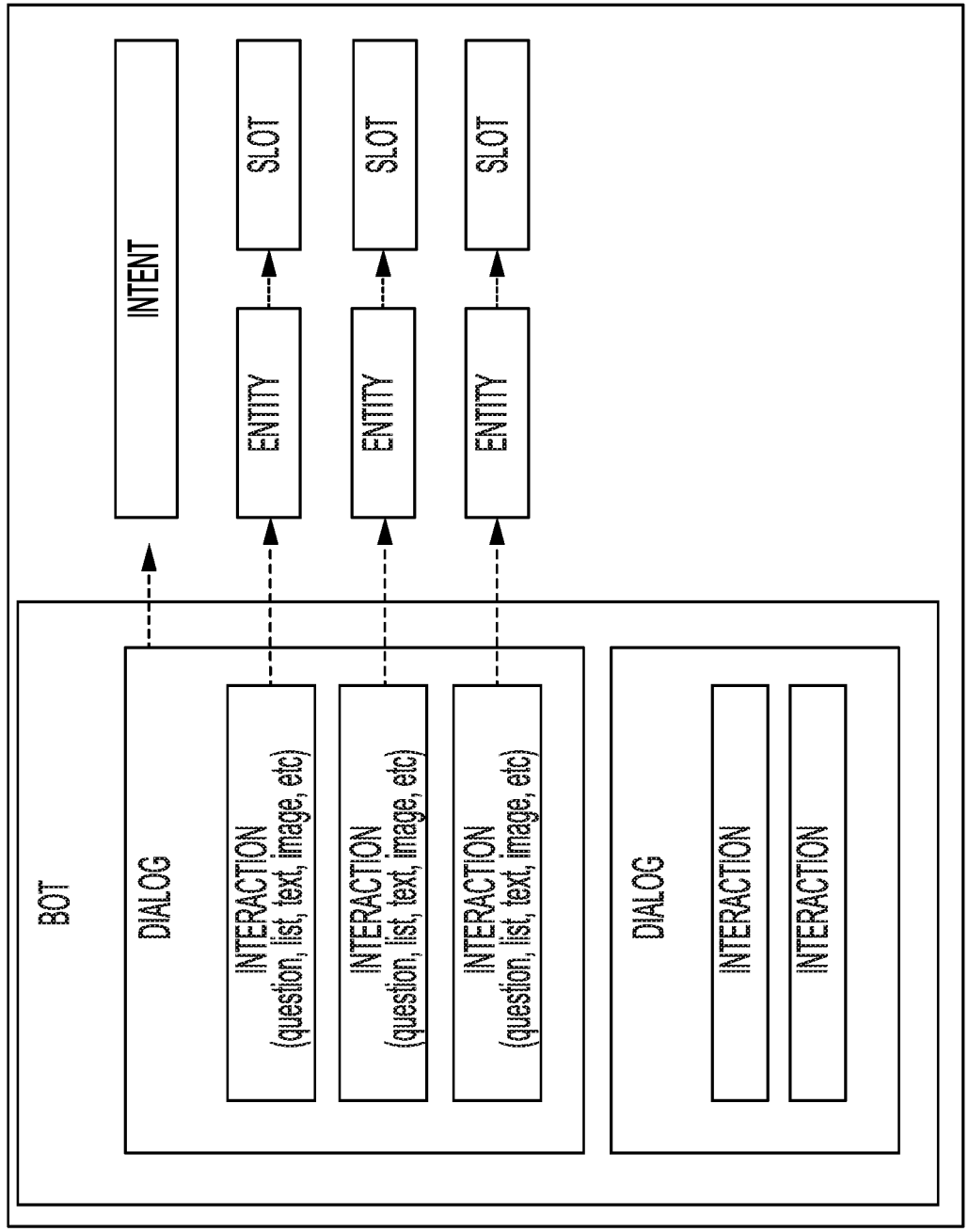
FIG. 6A-6D are diagrams illustrating exemplary analytic processes performed during certain steps in automated bot creation.
Figure 6B:
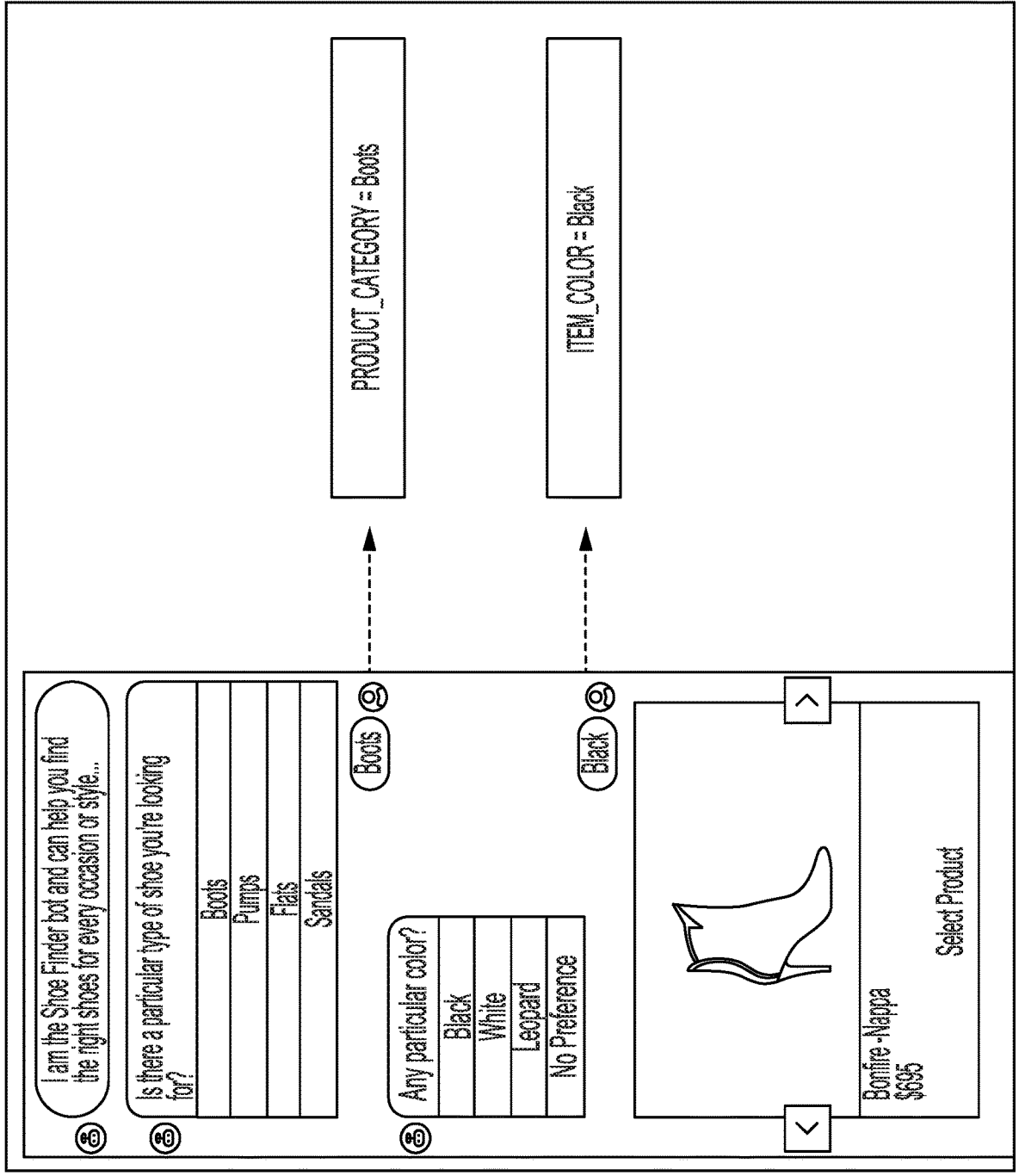

FIG. 6A-6D are diagrams illustrating exemplary analytic processes performed during certain steps in automated bot creation. FIG. 6A illustrates an exemplary blueprint for a bot, which includes dialogues associated with one or more interactions. Each dialogue may be identified as associated with a particular intent, and each interaction may include one or more entities and slots. For example, FIG. 6B illustrates a "Shoe Finder" bot entity (e.g., associated with an intent to find shoes) that conducts an exemplary dialogue. Meanwhile, the customer responses (e.g., "Boots" and "Black" may be used to fill in the slots associated with the "Shoe Finder" bot entity.

Figure 6C:
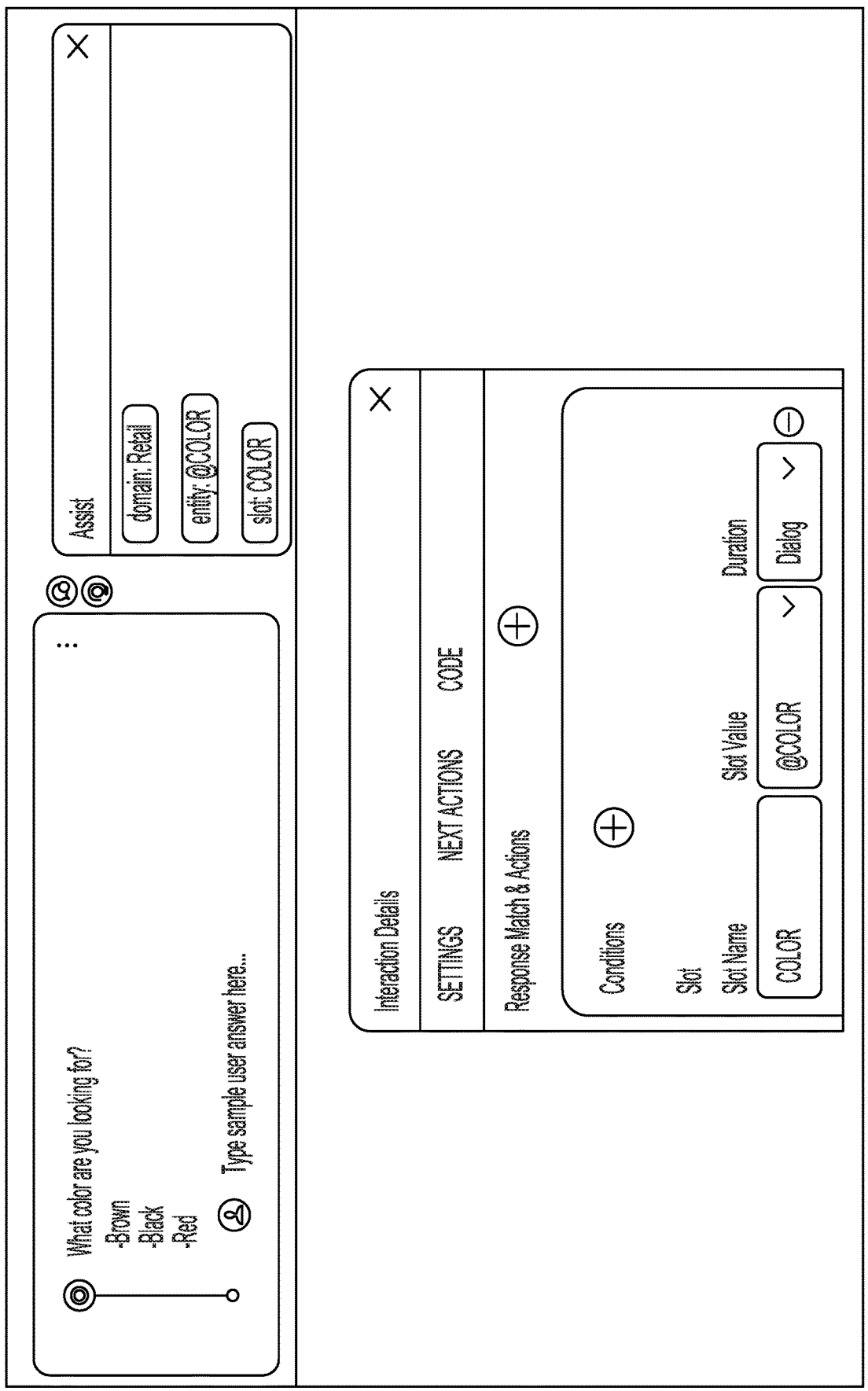
Figure 6D:
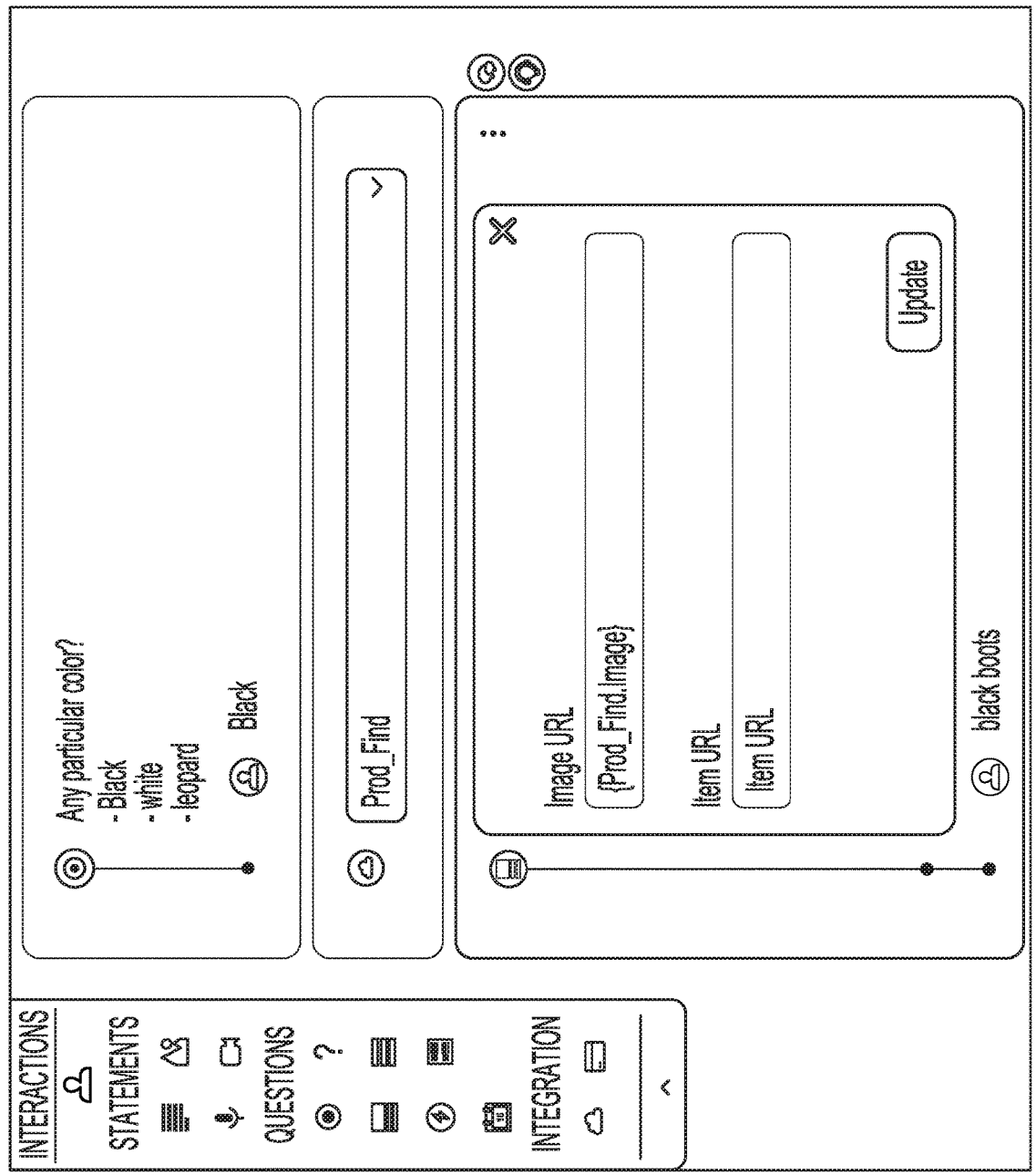

FIG. 6C illustrates how an artificially intelligent (AI) assist widget may operate to guide creation of the bot in accordance with an automation associated with the intent and entity. For example, the illustrated AI assist widget that may assist in identifying the appropriate entity and slots in accordance with the requirements of the specific automated interaction. FIG. 6D further illustrates certain tools, including a product find tool ("Prod_Find") associated with a specified image URL and item URL Such image may be retrieved for display when the associated tool is initiated, and the item data may be retrieved for further display upon selection.

Figure 7A:
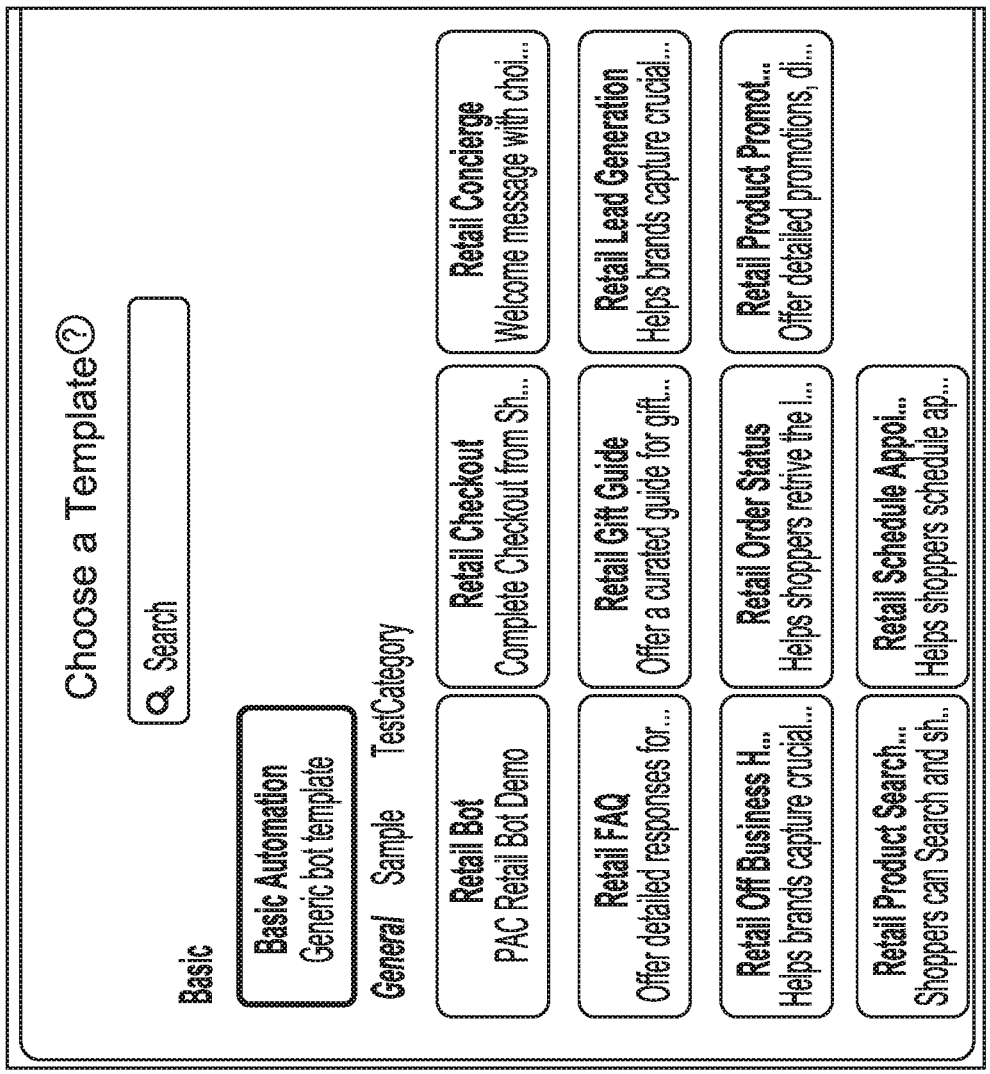
FIGS. 7A-7E illustrate exemplary graphic user interfaces (GUIs) providing customization tools by which a customized bot may be generated.

FIGS. 7A-7E illustrate exemplary graphic user interfaces (GUIs) providing customization tools by which a customized bot may be generated. FIG. 7A illustrates a variety of different automation templates that may be available for incorporation and customization in a bot. In some instances, the automation templates may be identified from a store of pre-existing templates, which may be filtered by relevance and applicability to industry vertical (e.g., retail, telecommunications, and finance). Common automation templates may include lead generation, product/service search and filter, product/service promotion, appointment scheduling, order status, frequently asked questions (FAQs), etc.

Figure 7B:
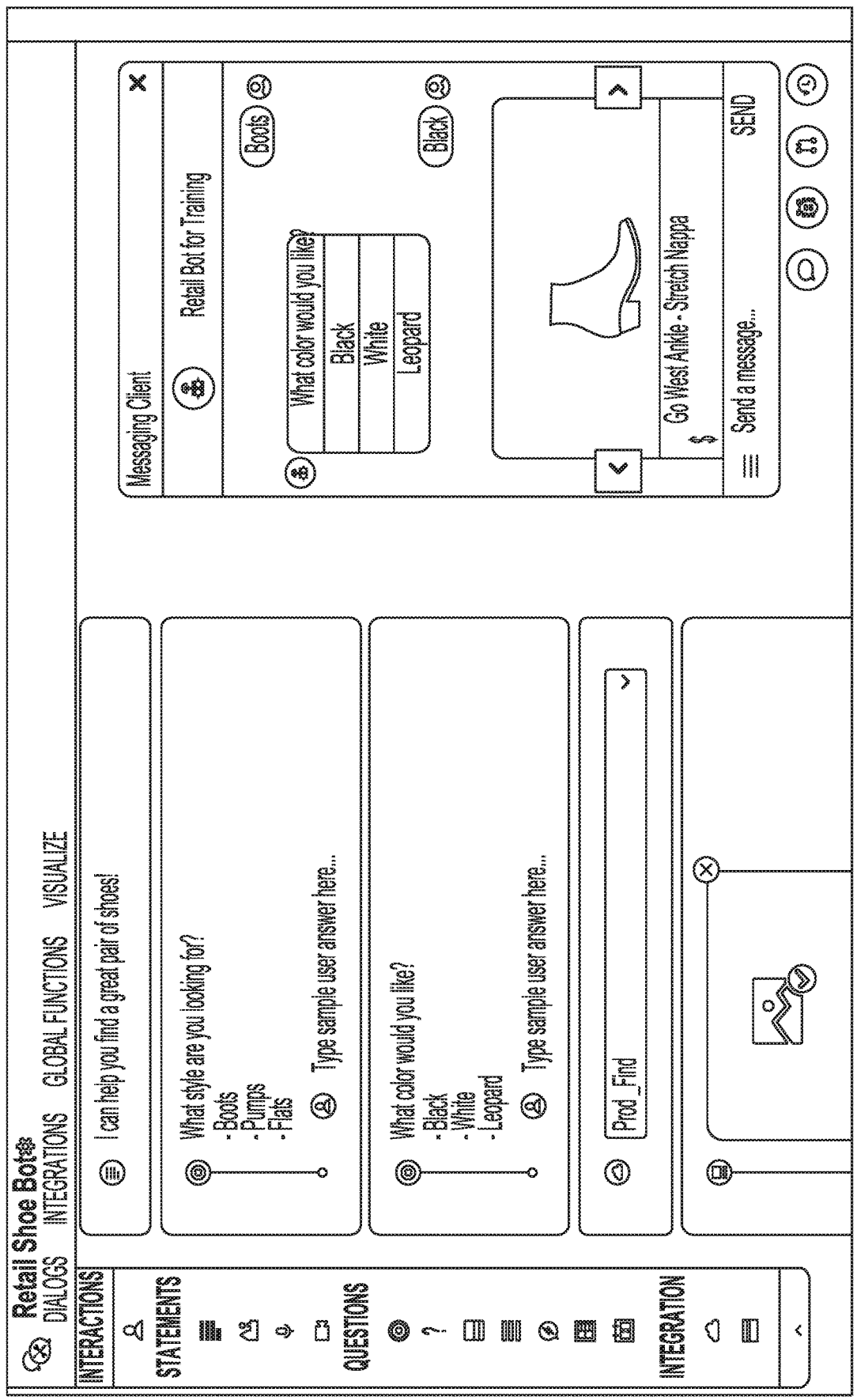

FIG. 7B illustrates a GUI that may be generated to display an imported and selected transcript following analysis and characterization of the statements therein. The resulting GUI therefore presents an agent with a display of transcript statements associated with specified parameters and matched to an automation template (e.g., made available with API integration). Each automation template may allow for different modifiers to be selected and incorporated into the resulting automation initiated by the custom bot. As such, new or modified automations may be created from existing templates.

The GUI of FIG. 7B further includes the chat bot conversation that may result based on the selected and customized template. Such GUI allows an agent to further modify and tweak the conversation diagram before the custom bot is generated. Generation of the custom bot may thereafter be based on the imported transcript that has been selected, analyzed, and characterized based on real-time intelligent insights, as well as agent input, to match certain statements with custom automations. Such bot may be generated anew or based on pre-existing bots that are modified in accordance with the transcript, analysis, and agent input. The resulting custom bot therefore not only reflects the intelligence that comes from analyzing a growing and evolving store of previous conversations and analyses in order to detect intent of a conversation and also detect the proper interaction needed to intelligently route to the appropriate channel to enable a smooth conversation.

Figure 7C:
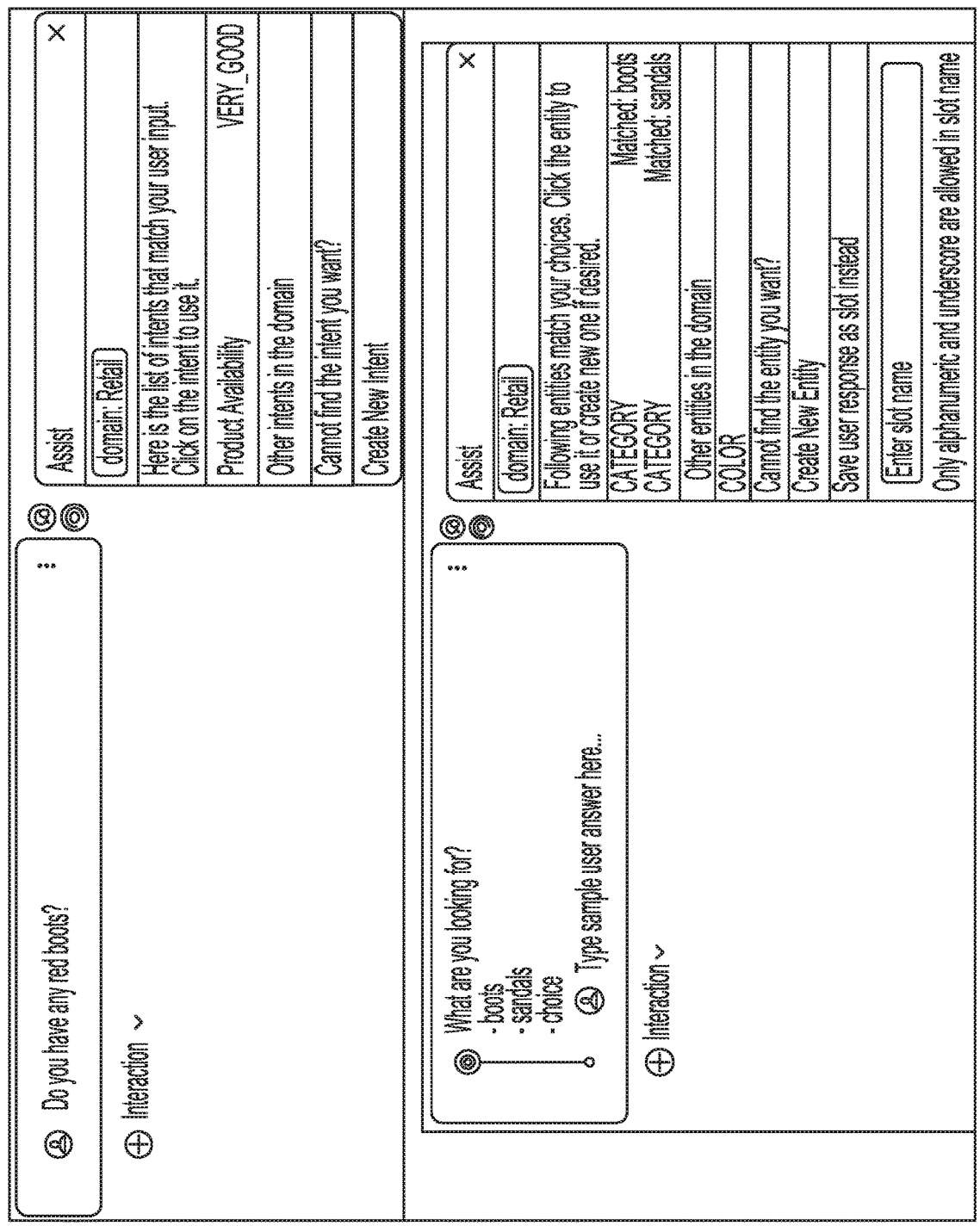
Figure 7D:
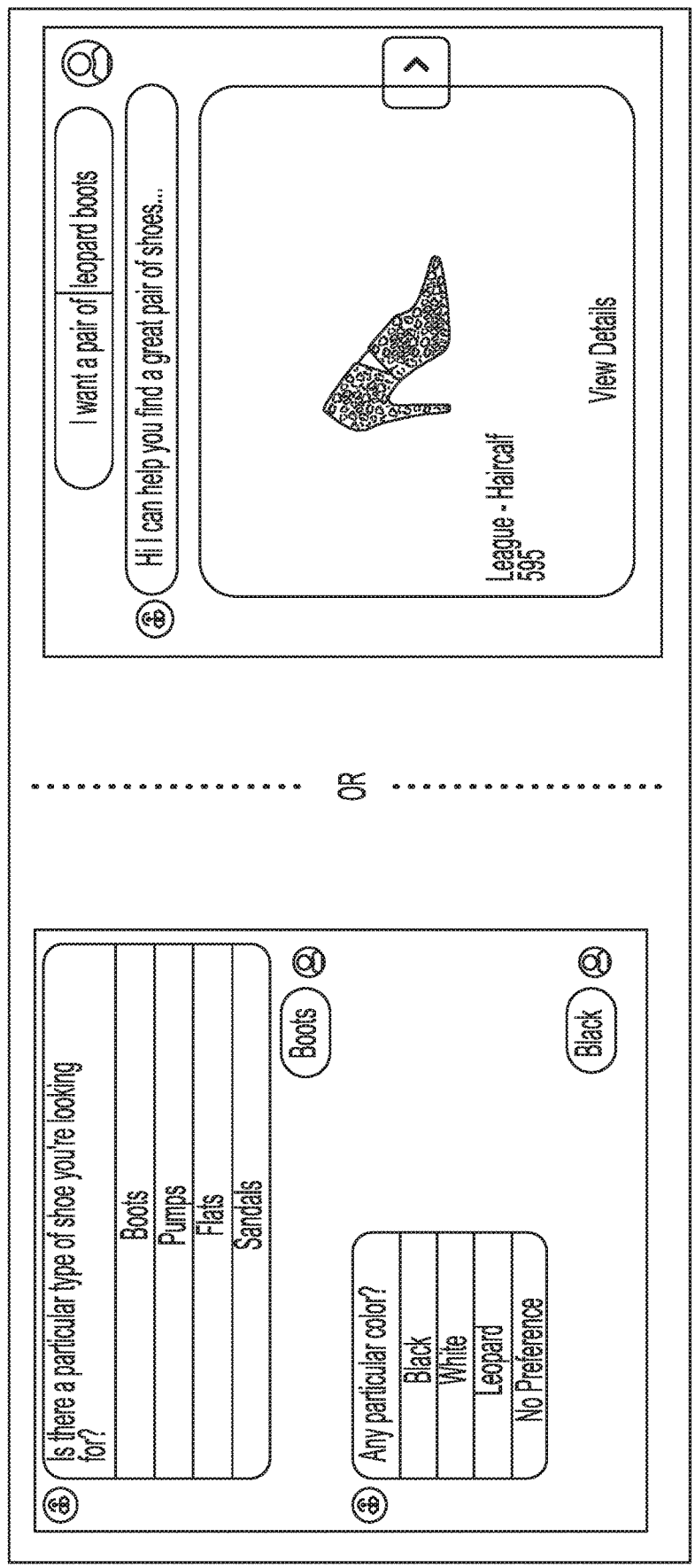

FIG. 7C illustrates the AI assist widget, which guides the agent based on the requirements of the automated interaction. For example, the AI assist widget may assist in identifying other intents associated with the entity, as well as the slots needed to be filled in order to run an automated interaction. FIG. 7D illustrates alternative ways to customize a bot response. Such exemplary responses may include listed options for shoe search, as well as illustrated options. Such data may be retrieved from designated product databases based on the identified intent and characterization parameters and presented to the customer for evaluation and selection.

Figure 7E:
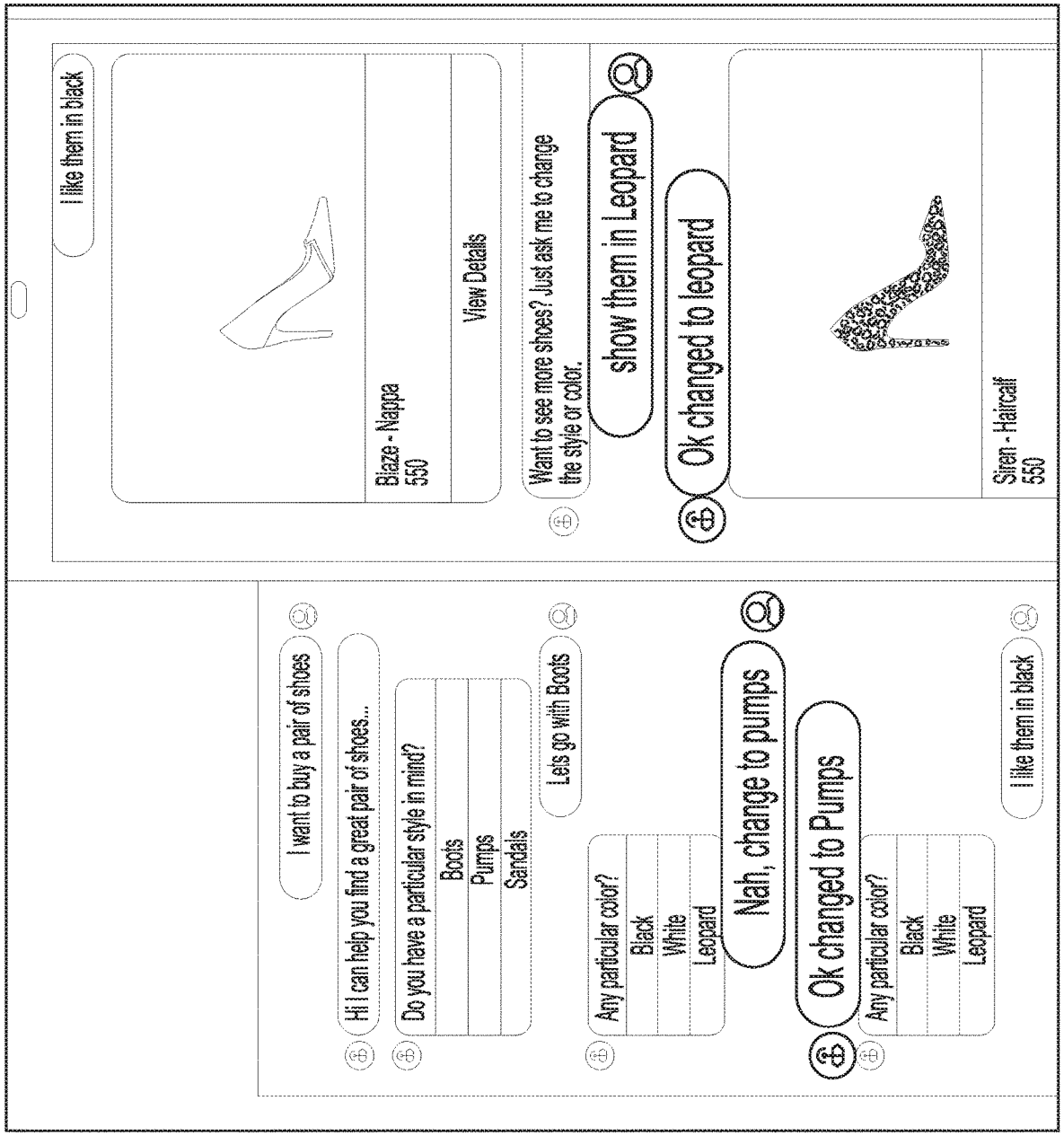

FIG. 7E illustrates an exemplary conversations that include a change in slot parameters. For example, one conversation includes a change from "boots" to "pumps," while the other conversation includes a change from "black" to "leopard." Such changes may therefore remove the prior slot parameter from the automation templates and replace with the new slot parameter provided by the customer.

In some embodiments, a conversation manager dashboard may be provided that allows an agent to manage and further train multiple bots. Such dashboard may be based on real-time analysis of current conversations to identify points (e.g., where a handoff may be desired) at which to route to certain automations. Such handoff may allow a conversation conducted by a bot to hand off to an agent, and vice versa, to provide efficient results. Insights from the conversation manager may further be used to supervise bot learning and improve bot-driven conversations and general bot operation further.

AI may analyze each step of a conversation to assess consumer intent, taking available context and history into consideration. With these capabilities, conversations may be automatically routed to the best automations tuned specifically for the brand and minimize need human intervention over time. If a conversation needs to be routed to an agent based on real time sentiment or consumer request, all the consumer and conversation details may be made available in structured form for the agent after a warm hand-off. The consumer has to repeat nothing, and the agent instantly can see the history of the conversation. Additionally, intent analysis will be available in real-time, giving brands an instant view in the questions customers and asking and allowing them take quick action.

Exemplary system in which automated bot creation and management may be implemente may include a conversation builder (including GUI-based tools for intelligent bot creation by agents), a conversation manager (bot management analytical tools), and conversation intelligence module (analytical insights into conversations). Such conversation tools may make use of artificial intelligence and machine learning available through an AI engine applied to a selected set of data. In addition to being built and managed intelligently, conversation tools may make use to any combination or automations that may be made available, either through proprietary systems or made available from third party service providers (through APIs). Such AI engine may therefore analyze all the conversations and scans each turn for intent and next best action, which may enables a suite of features from smart routing between bots, agents, and automations, as well as intelligent handoffs; trend detection and reaction, analytics, recommendations, etc. Some embodiments may include an agent assist widget that recommends handoffs to certain bots/automations at certain points and handoffs from bots at other points based on real-time capacity, intent, and other insights. As such, existing automation templates may be customized by an agent to enhance branding, as well as integrate into the brand's systems or third party services. In addition, such agent may monitor the bot in real-time so as to flag any potential issues and to refine the bot based on the same In addition, some of these capabilities may exist in adjacent platforms that may be integrated and available for agents and managers to use in one cohesive experience. The resulting platform may use AI to orchestrate conversations across all messaging channels (e.g., online, websites, SMS, social media and messaging applications such as WhatsApp or Facebook Messenger) that supports integrations through a powerful set of APIs.

The present invention may be implemented in an application that may be operable using a variety of computing devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
   storing information in memory regarding a set of different automation templates for initiating automated workflows of one or more automated actions associated with different intents;
   identifying an intent within a selected transcript, wherein the intent is associated with a point within the transcript;
   matching the intent to one of the stored automation templates, the matching automation template including one or more slots of information associated with running one or more automated actions of an associated automated workflow;
   customizing the automated workflow of the matching automation template by filling in the one or more slots of information associated with the matching automation template based on the identified intent;
   displaying the transcript in a graphic user interface, wherein the point within the transcript is identified as an integration point associated with the matching automation template; and
   generating a custom bot configured to conduct a conversation based on the customized automated workflow and the integration point identified within the transcript, wherein the custom bot initiates the one or more automated actions of the customized automated workflow at the integration point in accordance with the filled-in slots of information of the matching automation template.

2. The method of claim 1, further comprising storing one or more different statement types associated with the intents, wherein identifying the intent is based on identifying the different statement types within the transcript.

3. The method of claim 1, wherein the matching automation template includes one or more predefined automations, and wherein generating the custom bot includes using one or more application programming interfaces (APIs) to integrate a corresponding service associated with the one or more predefined automations into the customized automated workflow.

4. The method of claim 1, wherein matching the intent to the matching automation template is based on one or more parameters associated with the matching automation template.

5. The method of claim 1, further comprising generating an AI assist widget executable to assist with customization of the bot.

6. The method of claim 5, wherein the AI assist widget assists with customization of the bot by identifying one or more additional intents based on real-time analysis of a current conversation.

7. The method of claim 5, wherein the AI assist widget assists with customization of the bot by identifying the one or more slots of the matching automation template that need to be filled.

8. The method of claim 5, wherein the AI assist widget assists with customization of the bot by recommending incorporation of a handoff according to one or more real-time insights.

9. The method of claim 1, further comprising receiving customization input regarding one or more statements within the transcript displayed by the graphic user interface, and modifying the statements based on the customization input, the modified statements incorporated into the custom bot.

10. The method of claim 1, further comprising receiving customization input regarding the matching automation template matched to the transcript displayed by the graphic user interface, and modifying the matching automation template based on the customization input, the modified automation template incorporated into the custom bot.

11. A system comprising:
    memory that stores information regarding a set of different automation templates for initiating automated workflows of one or more automated actions associated with different intents;
    a processor that executes instructions stored in memory to:
      identify an intent within a selected transcript, wherein the intent is associated with a point within the transcript;
      match the intent to one of the stored automation templates, the matching automation template including one or more slots of information associated with running one or more automated actions of an associated automated workflow; and
      customize the automated workflow of the matching automation template by filling in the one or more slots of information associated with the matching automation template based on the identified intent; and
    a graphic user interface that displays the transcript, wherein the point within the transcript is identified as an integration point associated with the matching automation template; and
    wherein the processor executes further instructions to generate a custom bot configured to conduct a conversation based on the customized automated workflow and the integration point identified within the transcript, wherein the custom bot initiates the one or more automated actions of the customized automated workflow at the integration point in accordance with the filled-in slots of information of the matching automation template.

12. The system of claim 11, wherein the memory further stores one or more different statement types associated with the intents, wherein the processor identifies the intent based on identifying the different statement types within the transcript.

13. The system of claim 11, wherein the matching automation template includes one or more predefined automations, and wherein the processor generates the custom bot by using one or more application programming interfaces (APIs) to integrate a corresponding service associated with the one or more predefined automations into the customized automated workflow.

14. The system of claim 11, wherein the processor matches the intent to the matching automation template based on one or more parameters associated with the matching automation template.

15. The system of claim 11, wherein the processor executes further instructions to generate an AI assist widget executable to assist with customization of the bot.

16. The system of claim 15, wherein the AI assist widget assists with customization of the bot by identifying one or more additional intents based on real-time analysis of a current conversation.

17. The system of claim 15, wherein the AI assist widget assists with customization of the bot by identifying the one or more slots of the matching automation template that need to be filled.

18. The system of claim 15, wherein the AI assist widget assists with customization of the bot by recommending incorporation of a handoff according to one or more real-time insights.

19. The system of claim 11, wherein the graphic user interface further receives customization input regarding one or more statements within the transcript, and wherein the processor modifies the statements based on the customization input, the modified statements incorporated into the custom bot.

20. The system of claim 11, wherein the graphic user interface further receives customization input regarding the matching automation template matched to the transcript, and wherein the processor modifies the matching automation template based on the customization input, the modified automation template incorporated into the custom bot.

21. A non-transitory, computer-readable storage medium, having embodied thereon a program executable by a processor to perform method comprising:
  storing information in memory regarding a set of different automation templates for initiating automated workflows of one or more automated actions associated with different intents;
  identifying an intent within a selected transcript, wherein the intent is associated with a point within the transcript;
  matching the intent to one of the stored automation templates, the matching automation template including one or more slots of information associated with running one or more automated actions of an associated automated workflow;
  customizing the automated workflow of the matching automation template by filling in the one or more slots of information associated with the matching automation template based on the identified intent;
  displaying the transcript in a graphic user interface, wherein the point within the transcript is identified as an integration point associated with the matching automation template; and
  generating a custom bot configured to conduct a conversation based on the customized automated workflow and the integration point identified within the transcript, wherein the custom bot initiates the one or more automated actions of the customized automated workflow at the integration point in accordance with the filled-in slots of information of the matching automation template.

22. The non-transitory, computer-readable storage medium of claim 21, further comprising storing one or more different statement types associated with the intents, wherein identifying the intent is based on identifying the different statement types within the transcript.

23. The non-transitory, computer-readable storage medium of claim 21, wherein the matching automation template includes one or more predefined automations, and wherein generating the custom bot includes using one or more application programming interfaces (APIs) to integrate a corresponding service associated with the one or more predefined automations into the customized automated workflow.

24. The non-transitory, computer-readable storage medium of claim 21, wherein matching the intent to the matching automation template is based on one or more parameters associated with the matching automation template.

25. The non-transitory, computer-readable storage medium of claim 21, further comprising generating an AI assist widget executable to assist with customization of the bot.

26. The non-transitory, computer-readable storage medium of claim 25, wherein the AI assist widget assists with customization of the bot by identifying one or more additional intents based on real-time analysis of a current conversation.

27. The non-transitory, computer-readable storage medium of claim 25, wherein the AI assist widget assists with customization of the bot by identifying the one or more slots of the matching automation template that need to be filled.

28. The non-transitory, computer-readable storage medium of claim 25, wherein the AI assist widget assists with customization of the bot by recommending incorporation of a handoff according to one or more real-time insights.

29. The non-transitory, computer-readable storage medium of claim 21, further comprising receiving customization input regarding one or more statements within the transcript displayed by the graphic user interface, and modifying the statements based on the customization input, the modified statements incorporated into the custom bot.

30. The non-transitory, computer-readable storage medium of claim 21, further comprising receiving customization input regarding the matching automation template matched to the transcript displayed by the graphic user interface, and modifying the matching automation template based on the customization input, the modified automation template incorporated into the custom bot.

* * * * *